(12) United States Patent
Liu

(10) Patent No.: US 11,177,867 B2
(45) Date of Patent: Nov. 16, 2021

(54) BEAM REPORTING AND ADJUSTING METHOD AND APPARATUS, USER EQUIPMENT, AND BASE STATION

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/644,163

(22) PCT Filed: Sep. 4, 2017

(86) PCT No.: PCT/CN2017/100406
§ 371 (c)(1),
(2) Date: Mar. 4, 2020

(87) PCT Pub. No.: WO2019/041348
PCT Pub. Date: Mar. 7, 2019

(65) Prior Publication Data
US 2021/0067228 A1    Mar. 4, 2021

(51) Int. Cl.
*H04B 7/06* (2006.01)
*H04W 76/28* (2018.01)
(Continued)

(52) U.S. Cl.
CPC ...... *H04B 7/0695* (2013.01); *H04W 52/0241* (2013.01); *H04W 56/001* (2013.01);
(Continued)

(58) Field of Classification Search
CPC .... H04B 7/0695; H04B 7/063; H04B 7/2123; H04B 7/2121; H04W 76/28; H04W 76/27;
(Continued)

(56) References Cited

U.S. PATENT DOCUMENTS

2020/0092846 A1*  3/2020 Deng ............... H04B 7/0695

FOREIGN PATENT DOCUMENTS

CN    107079404 A    8/2017

OTHER PUBLICATIONS

Li, Yu-Ngok Ruyue, et al. "Power Saving Techniques for 5G and Beyond." IEEE Access 8 (2020): 108675-108690. (Year: 2020).*
(Continued)

*Primary Examiner* — Sharad Rampuria
(74) *Attorney, Agent, or Firm* — Arch & Lake LLP

(57) ABSTRACT

Provided are methods and apparatuses for beam reporting and adjustment, UE, a base station and a computer-readable storage medium. The beam reporting method includes: in response to that a number of times that an index of a SSB obtained by downlink synchronization is not within a predetermined beam window reaches a preset number of times, reporting a beam updating message to a base station; and receiving a beam update confirmation message from the base station. Accordingly, in response to the number of times that the index of the SSB obtained by downlink synchronization is not in the predetermined beam window reaches the preset number of times, the beam updating message is reported to the base station to enable the base station to adjust a beam, so that a certain number of beams can always be kept between the UE and the base station, thereby providing a basis for subsequent receiving of a paging message through part of the beams.

9 Claims, 16 Drawing Sheets

(51) Int. Cl.
*H04W 76/27* (2018.01)
*H04W 52/02* (2009.01)
*H04W 56/00* (2009.01)
*H04W 68/00* (2009.01)

(52) U.S. Cl.
CPC ......... *H04W 68/005* (2013.01); *H04W 76/27* (2018.02); *H04W 76/28* (2018.02)

(58) Field of Classification Search
CPC ........... H04W 52/0241; H04W 56/001; H04W 68/005; H04W 72/04; H04W 72/12; H04W 76/00; H04W 24/10; H04W 68/00; H04J 2203/0069; H04Q 2213/394
See application file for complete search history.

(56) References Cited

OTHER PUBLICATIONS

Ratasuk, Rapeepat, et al. "Overview of narrowband IoT in LTE Rel-13." 2016 IEEE conference on standards for communications and networking (CSCN). IEEE, 2016. (Year: 2016).*
International Search Report to PCT Application No. PCT/CN2017/100406 dated May 2, 2018, (4p).
Samsung "3GPP TSG RAN WG1 NR Ad Hoc Meeting R1-1700889" Paging channel design, Jan. 20, 2017, (5p).
Xiaomi 3GPP TSG RAN WG1 NR AH meeting R1-1700865, Discussion on NR paging design, Jan. 20, 2017, (3p).
Mediatek Inc. "3GPP TSG-RAN WG2 Meeting #95bis R2-166107", IDLE Mode Operation in NR, Oct. 14, 2016, (5p).
International Search Report and Written Opinion of International Application No. PCT/CN2017/100406, dated May 2, 2018 with English translation, (6p).
First Office Action of the Chinese Application No. 201780001094.6, dated Aug. 26, 2019 with English translation (11p).
Second Office Action of the Chinese application No. 201780001094.6, dated Apr. 23, 2020 with English translation, (13p).
Samsung, "Paging Channel Design" 3GPP TSG RAN WG1 NR Ad-Hoc Meeting R1-1700889, Spokane, Washington, Jan. 20, 2017, (5p).
Xiaomi, "Discussion on NR Paging Design", 3GPP TSG RAN WG1 NR AH Meeting R1-1700865, Reno, Nevada, Jan. 20, 2017, (3p).
MediaTek Inc., "IDLE Mode Operation in NR", 3GPP TSG-RAN WG2 Meeting #95bis R2-166107, Kaohsiung, Taiwan, Oct. 14, 2016, (6p).
3GPP TR 38.811V0.1.0 (Jun. 2017). 3rd Generation Partnership Project; Technical Specification Group Radio Access Network; Study on New Radio (NR) to Support Non Terrestrial Networks, (Release 15), (22p).
ZTE, "Paging Design in NR" 3GPP TSG RAN WG1 Meeting #90 R1-1712063, Prague, Czech Republic, Aug. 25, 2017, (7p).
LG Electronics, "Paging Design in NR" 3GPP TSG RAN WG1 Meeting #90 R1-1713127, Prague, Czech Republic, Aug. 25, 2017, (5p).

* cited by examiner

BEAM REPORTING AND ADJUSTING METHOD AND APPARATUS, USER EQUIPMENT, AND BASE STATION

CROSS-REFERENCE TO RELATED APPLICATION

This application is the U.S. national phase of PCT Patent Application No. PCT/CN2017/100,406, filed on Sep. 4, 2017, the content of which is incorporated herein by reference in its entirety.

TECHNICAL FIELD

The present disclosure generally relates to the technical field of communication, and more particularly, to methods and apparatuses for beam reporting and adjustment, User Equipment (UE), a base station and a computer-readable storage medium.

BACKGROUND

Along with rapid development of wireless communication technologies, 5th Generation (5G) systems emerge. A 5G system may be applied to high bands, i.e., bands above 6G Hz. In a high band, due to a poor propagation characteristic of a radio wave, conventional omnidirectional transmission is not applicable anymore, and beam scanning and beam management may be needed for communication.

SUMMARY

In view of this, the present application discloses methods and apparatuses for beam reporting and adjustment, UE, a base station and a computer-readable storage medium. A base station may adjust a beam, so that a certain number of beams can always be kept between UE and the base station, thereby providing a basis for subsequent sending and receiving of a paging message through part of the beams.

According to a first aspect of the present disclosure, a method for beam reporting is provided, which may be applied to UE and include in response to a number of times that an index of a Synchronous Signal Block (SSB) obtained by downlink synchronization is not within a predetermined beam window reaches a preset number of times, a beam updating message is reported to a base station; and a beam update confirmation message sent by the base station is received.

According to a second aspect of the present disclosure, a method for beam adjustment is provided, which may be applied to a base station and include that: a beam updating message reported by UE is received; the beam updating message is recorded; and a beam update confirmation message is sent to the UE.

According to a third aspect of the present disclosure, a user equipment for beam reporting is provided, which may include: a processor; and a memory configured to store an instruction executable by the processor, wherein the processor is configured to: report a beam updating message to a base station, when a number of times that an index of an SSB obtained by downlink synchronization is not within a predetermined beam window reaches a preset number of times; and receive a beam update confirmation message from the base station according to the beam updating message.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
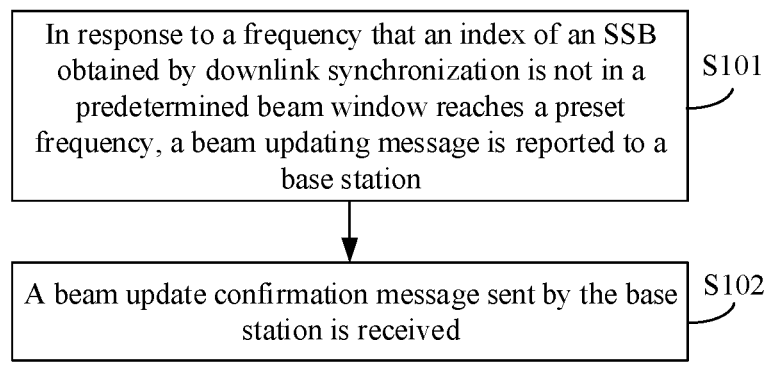
FIG. 1 is a flowchart showing a beam reporting method according to an exemplary embodiment of the present application.

Reference will now be made in detail to exemplary embodiments, examples, which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In the accompanying drawings, various of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included. Furthermore, in the context of the present disclosure, the term "BS" may represent, e.g., a node B (NodeB or NB), an evolved NodeB (eNodeB or eNB), a radio header (RH), a remote radio head (RRH), a relay, or a low power node such as a femto, a pico, and so on.

A Synchronous Signal Block (SSB), as a basis for downlink beam measurement in an initial access process, generally includes a beam index (ID), and UE may report a beam according to the ID.

There are different types of UEs in a 5G system. An important type is low-delay UEs, and UEs of this type often have a high delay requirement and are not so power-consuming. Paging is mainly to notify a connection request from a UE in an idle state and notify a change of a system message to a UE in an idle or connected state. However, a base station, when sending a paging message to a UE in an idle state, often does not know where the UE is and thus may send the paging message only in a manner of scanning all beams, which inevitably brings information redundancy and delay.

In a related art, a UE, after obtaining a paging notification, often actively reports a beam, so that a base station may send paging information in a direction of reporting the beam.

However, paging is not sent for only one UE but usually for a group of UEs, which may bring mistaken notifications to other UEs in the group and increase power consumption of the UEs that are not paged and increase an uplink load of a system.

FIG. 1 is a flowchart showing a beam reporting method according to an exemplary embodiment of the present application. The embodiment is described from a UE side. As shown in FIG. 1, the beam reporting method includes the following steps.

In step S101, in response to a number of times that an index of an SSB obtained by downlink synchronization is not in a predetermined beam window reaches a preset number of times, report a beam updating message to a base station.

In the embodiment, during downlink synchronization, in a case that the number of times that the index of the obtained SSB is not in the predetermined beam window reaches the preset number of times, a UE may report the beam updating message to the base station to enable the UE to adjust a beam.

The preset number of times may be set according to a requirement, which for example, may be set as 3. When the preset number of times is greater than 1, the beam updating message may be prevented from being immediately reported in a case that an index of an obtained SSB is not in the beam window, thereby avoiding the beam updating message from being reported due to a misjudgment.

In step S102, a beam update confirmation message sent by the base station is received.

The base station, after receiving the beam updating message reported by the UE, may send the beam update confirmation message to the UE, namely notifying the UE that the base station has performed beam adjustment.

According to the embodiment, in response to the number of times that the index of the SSB obtained by downlink synchronization is not in the predetermined beam window reaches the preset number of times, the beam updating message may be reported to the base station to enable the base station to adjust a beam, so that a certain number of beams can always be kept between the UE and the base station, thereby providing a basis for subsequent receiving of the paging message through part of the beams.

Figure 2A:
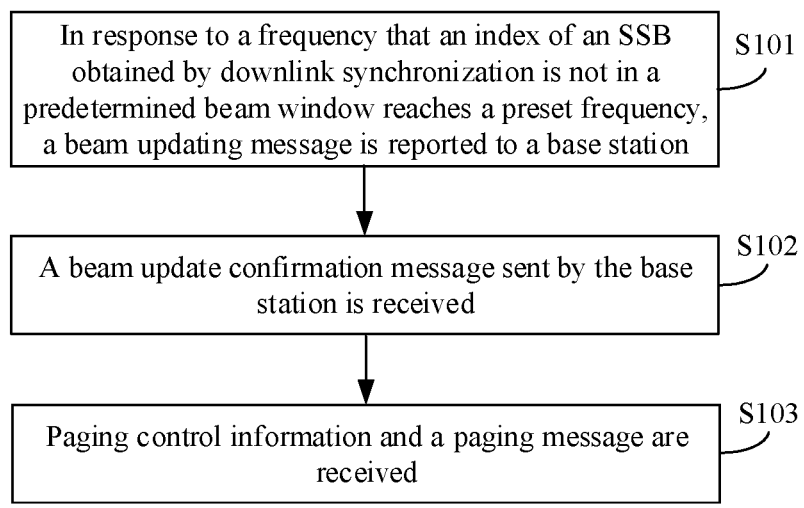
FIG. 2A is a flowchart showing a beam reporting method according to an exemplary embodiment of the present application.

FIG. 2A is a flowchart showing another beam reporting method according to an exemplary embodiment of the present application. As shown in FIG. 2A, when step S102 is executed, the beam reporting method may further include the following step.

In step S103, paging control information and a paging message are received.

In the embodiment, in a case that a paging request of the UE appears in a present period, the base station, when sending the beam update confirmation message to the UE, may send the paging control information and the paging message to the UE.

The paging control information may be a paging indicator, and may also be control information in a Physical Downlink Control Channel (PDCCH).

According to the embodiment, when the beam update confirmation message sent by the base station is received, the paging control information and the paging message may be received from the base station, so that not only the paging message can be received, but also transmission resources can be saved.

Figure 2B:
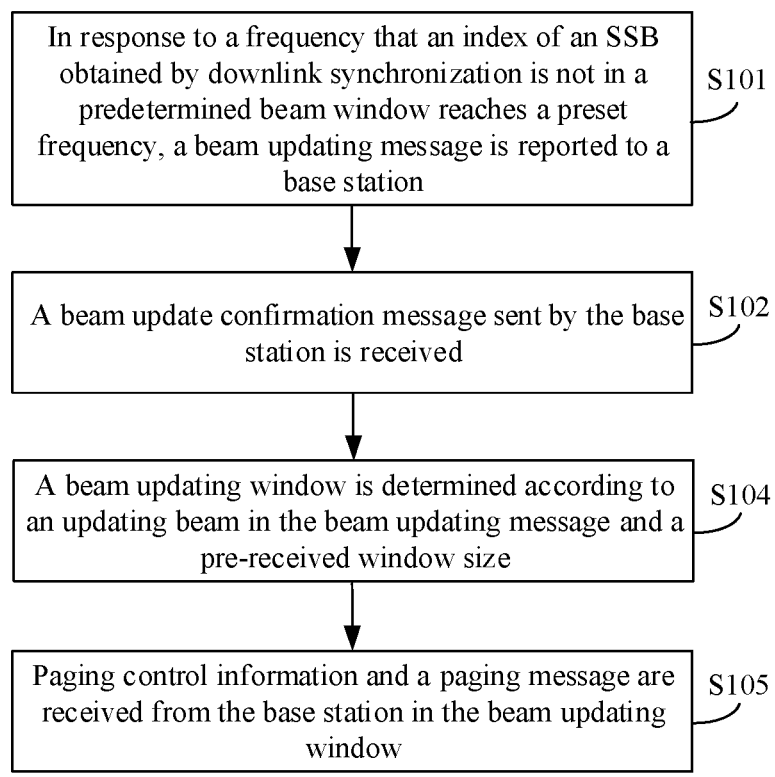
FIG. 2B is a flowchart showing a beam reporting method according to an exemplary embodiment of the present application.

FIG. 2B is a flowchart showing another beam reporting method according to an exemplary embodiment of the present application. As shown in FIG. 2B, after step S102 is executed, the beam reporting method may further include the following steps.

In step S104, a beam updating window is determined according to an updating beam in the beam updating message and a pre-received window size.

In step S105, the paging control information and the paging message are received from the base station in the beam updating window.

In the embodiment, when the paging request of the UE appears in a next period, the base station may determine the beam updating window according to the updating beam and the pre-configured window size, and may send the paging control information and the paging message to the UE in the beam updating window. Correspondingly, the UE may also determine the beam updating window according to the updating beam and the pre-received window size, and receive the paging control information and paging message from the base station in the beam updating window.

According to the embodiment, the beam updating window may be determined according to the updating beam and the pre-received window size, and the paging control information and the paging message may be received from the base station in the beam updating window. In such a manner, the paging message may be received through the beam updating window, namely the paging message may be received through a certain number of beams rather than not all beams, so that system resources can be effectively saved.

Figure 3:
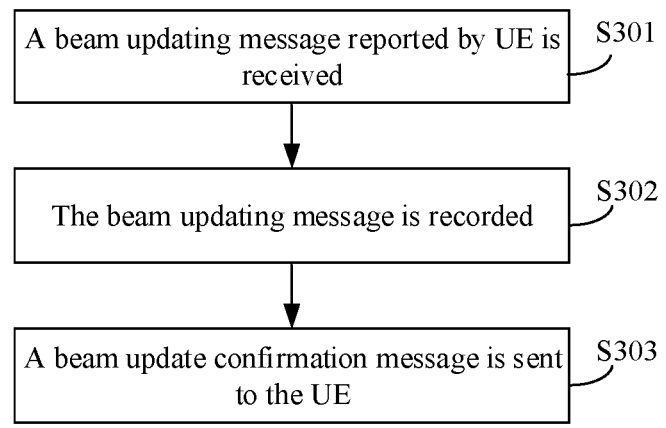
FIG. 3 is a flowchart showing a beam adjustment method according to an exemplary embodiment of the present application.

FIG. 3 is a flowchart showing a beam adjustment method according to an exemplary embodiment of the present application. The embodiment is described from a base station side. As shown in FIG. 3, the beam adjustment method includes the following steps.

In step S301, a beam updating message reported by UE is received.

In the embodiment, during downlink synchronization, in response to a number of times that an index of an obtained SSB is not in a predetermined beam window reaches a preset number of times, the UE may report the beam updating message to a base station.

In step S302, the beam updating message is recorded.

The base station, after receiving the beam updating message, may record the beam updating message.

In step S303, a beam update confirmation message is sent to the UE.

The base station, after adjusting a beam, may send the beam update confirmation message to the UE.

According to the embodiment, the beam updating message reported by the UE may be received and recorded, and then the beam update confirmation message may be sent to the UE to implement beam adjustment, so that a certain number of beams can always be kept between the UE and the base station, thereby providing a basis for subsequent receiving of the paging message through part of the beams.

Figure 4:
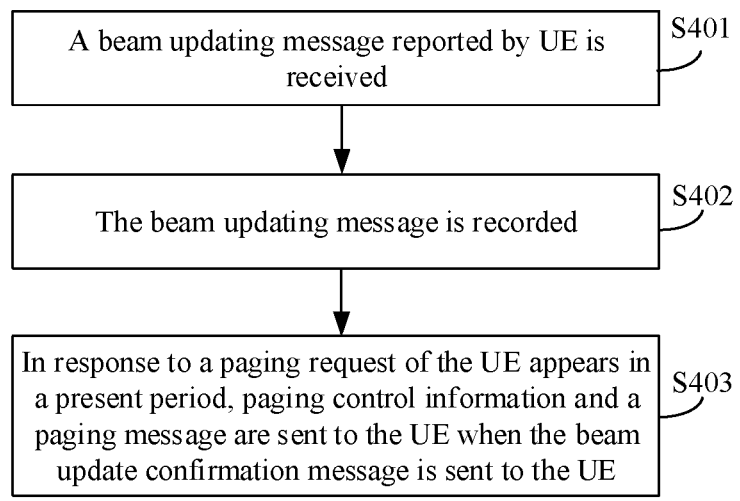
FIG. 4 is a flowchart showing another beam adjustment method according to an exemplary embodiment of the present application.

FIG. 4 is a flowchart showing another beam adjustment method according to an exemplary embodiment of the present application. The embodiment is described from a base station side. As shown in FIG. 4, the beam adjustment method includes the following steps.

In step S401, a beam updating message reported by UE is received.

In step S402, the beam updating message is recorded.

In step S403, in response to a paging request of the UE appears in a present period, paging control information and a paging message are sent to the UE when a beam update confirmation message is sent to the UE.

In the embodiment, in a case that the paging request of the UE appears in the present period, the base station, when sending the beam update confirmation message to the UE, may send the paging control information and the paging message to the UE.

According to the embodiment, when the beam update confirmation message is sent to the UE, the paging control information and the paging message may be sent to the UE, so that not only the paging message is sent, but also transmission resources are saved.

Figure 5:
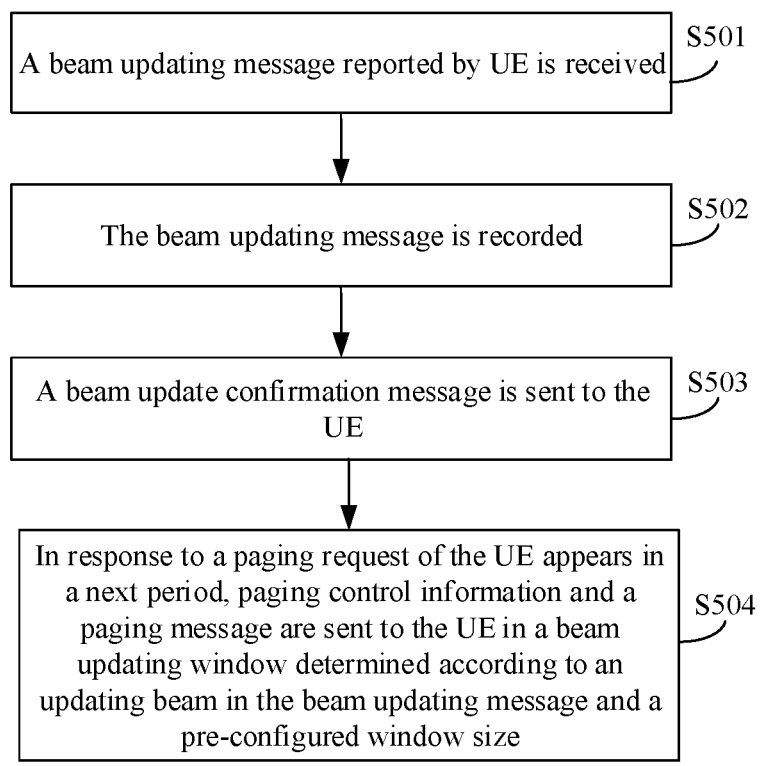
FIG. 5 is a flowchart showing another beam adjustment method according to an exemplary embodiment of the present application.

FIG. 5 is a flowchart showing another beam adjustment method according to an exemplary embodiment of the present application. The embodiment is described from a base station side. As shown in FIG. 5, the beam adjustment method includes the following steps.

In step S501, a beam updating message reported by UE is received.

In step S502, the beam updating message is recorded.

In step S503, a beam update confirmation message is sent to the UE.

In step S504, in response to a paging request of the UE appears in a next period, paging control information and a paging message are sent to the UE in a beam updating window determined according to an updating beam in the beam updating message and a pre-configured window size.

The beam updating window may be determined in step S502 or S504.

In the embodiment, when the paging request of the UE appears in the next period, the base station may determine the beam updating window according to the updating beam and the pre-configured window size, and may send the paging control information and the paging message to the UE in the beam updating window. Correspondingly, the UE may determine the beam updating window according to the updating beam and the pre-received window size, and may receive the paging control information and the paging message from the base station in the beam updating window.

According to the embodiment, the paging control information and the paging message may be sent to the UE in the beam updating window. In such a manner, the paging message may be sent through the beam updating window, namely the paging message may be sent through a certain number of beams rather than all beams, so that system resources can be effectively saved.

Figure 6:
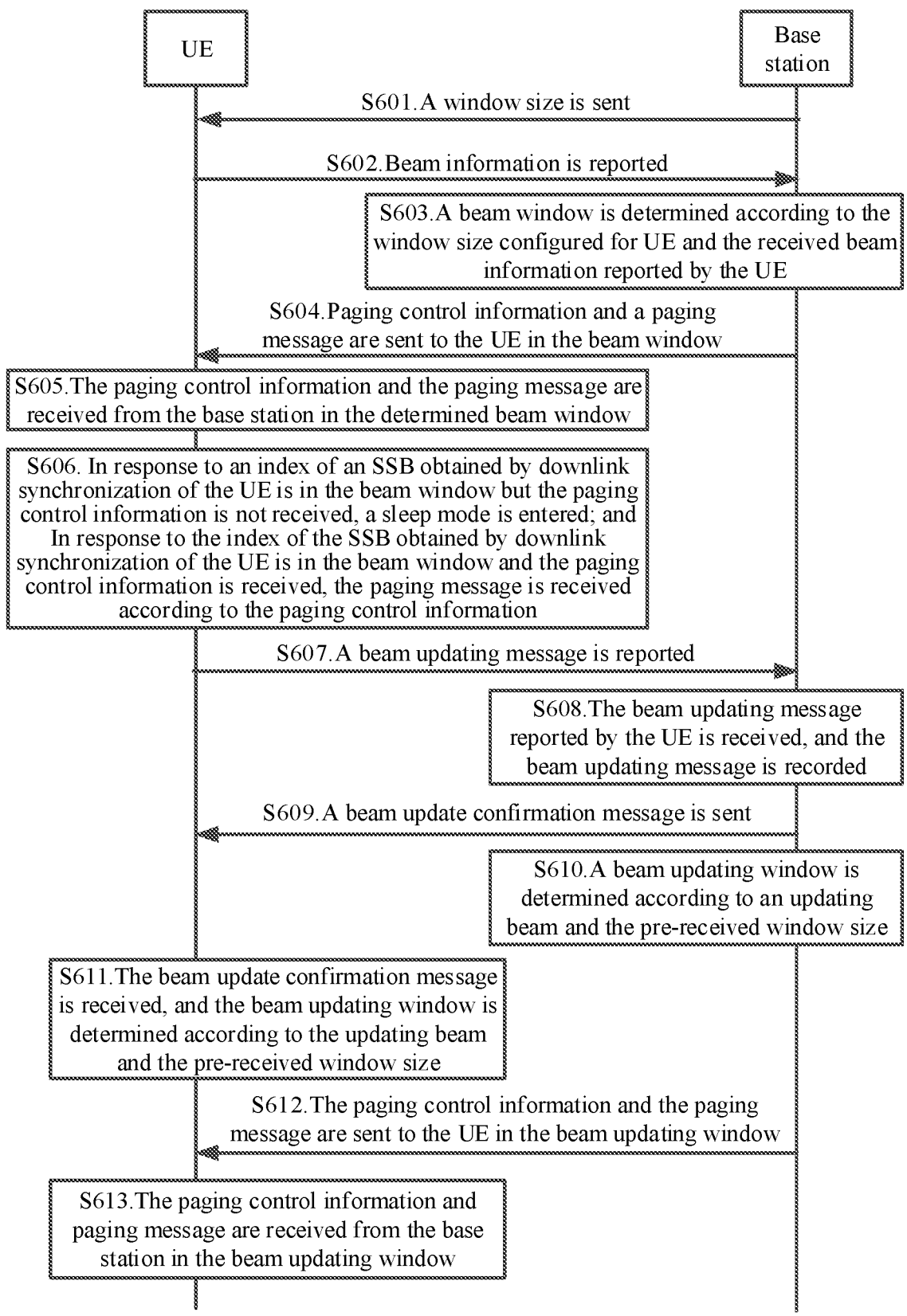
FIG. 6 is a signaling flowchart showing a beam sending method according to an exemplary embodiment of the present application.

FIG. 6 is a signaling flowchart showing a beam sending method according to an exemplary embodiment of the present application. The embodiment is described from the angle of interaction between a UE and a base station. As shown in FIG. 6, the beam sending method includes the following steps.

In step S601, the base station configures a window size for the UE and sends the window size to the UE.

This step is optional.

The base station may configure the window size for the UE through a high-layer message. For example, the window size may be sent to the UE through an RRC message.

In response to the base station sends the configured window size to the UE in this step, the UE may determine a beam window according to beam information for downlink synchronization and according to the window size.

For example, when the window size is 2 and a beam index for downlink synchronization is 2, the UE may determine that the beam window is beam {0, 1, 2, 3, 4}.

In step S602, the UE reports beam information to the base station before entering DRX.

DRX refers to that a UE sleeps for a period of time, detects whether there is any paging message or not after wakeup and then continues sleeping.

In the embodiment, if a base station does not configure a window size before, the base station may configure the window size for a UE in a process during which the UE reports beam information, and the UE may determine a beam window according to the beam information for downlink synchronization and according to the window size.

In step S603, the base station determines a beam window according to the window size configured for the UE and according to the received beam information reported by the UE.

For example, when the window size is 2 and the beam index reported by the UE is 2, the base station may determine that the beam window is beam {0, 1, 2, 3, 4}.

In step S604, the base station sends paging control information and a paging message to the UE in the beam window.

The paging control information may be a paging indicator.

In the embodiment, the paging control information and the paging message may be sent to the UE in the determined beam window, namely the paging message may be sent through a certain number of beams rather than all beams, so that system resources can be effectively saved.

In step S605, the UE receives the paging control information and the paging message from the base station in the determined beam window.

In the embodiment, the paging control information and the paging message sent by the base station are received in the determined beam window, namely the paging message may be received through a certain number of beams rather than all the beams, so that the system resources can be effectively saved.

In step S606, in response to an index of an SSB obtained by downlink synchronization of the UE is in the beam window but the paging control information is not received, a sleep mode is entered; and in response to the index of the SSB obtained by downlink synchronization of the UE is in the beam window and the paging control information is received, the paging message is received according to the paging control information.

In the embodiment, the UE, after waking up, may perform downlink synchronization and, in response to the index of the SSB obtained by downlink synchronization is in the beam window but the paging control information is not received, the UE may continue sleeping, so that power consumption is reduced. In response to the index of the SSB obtained by downlink synchronization is in the beam window and the paging control information is received, the paging message may be received according to the paging control information, namely the paging message may be received through a certain number of beams rather than all the beams, so that the system resources can be effectively saved.

In step S607, in response to a number of times that the index of the SSB obtained by downlink synchronization of the UE is not in the beam window reaches a preset number of times, a beam updating message is reported to the base station.

In step S608, the base station receives the beam updating message reported by the UE and records the beam updating message.

If the base station fails to receive the beam updating message from the UE, the base station may still send the paging message according to the beam window determined before.

In step S609, the base station sends a beam update confirmation message to the UE.

In step S610, the base station determines a beam updating window according to an updating beam in the beam updating message and the pre-received window size.

In response to a paging request of the UE appears at present, the base station, when sending the beam update confirmation message to the UE, may send the paging control information and the paging message to the UE.

In step S611, the UE receives the beam update confirmation message and determines the beam updating window according to the updating beam and the pre-received window size.

In step S612, in response to a paging request of the UE appears in a next period, the base station sends the paging control information and the paging message to the UE in the beam updating window.

In step S613, the UE receives the paging control information and the paging message from the base station in the beam updating window.

According to the embodiment, through the interaction between the UE and the base station, a certain number of beams can be kept between the UE and the base station, so that the paging message may be sent and received through a certain number of beams rather than all the beams, and the system resources are greatly saved.

Figure 7:
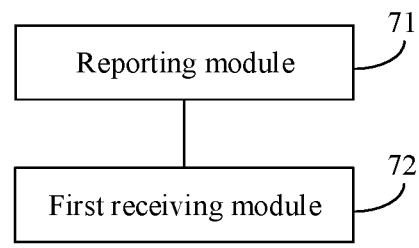
FIG. 7 is a block diagram of a beam reporting apparatus according to an exemplary embodiment.

FIG. 7 is a block diagram of a beam reporting apparatus according to an exemplary embodiment. The beam reporting apparatus may be located in UE. As shown in FIG. 7, the apparatus includes a reporting module 71 and a first receiving module 72.

The reporting module 71 is configured to, in response to a number of times that an index of an SSB obtained by downlink synchronization is not in a predetermined beam window reaches a preset number of times, report a beam updating message to a base station.

In the embodiment, during downlink synchronization, in response to the number of times that the index of the obtained SSB is not in the predetermined beam window reaches the preset number of times, the UE may report the beam updating message to the base station to enable the UE to adjust a beam.

The first receiving module 72 is configured to receive a beam update confirmation message from the base station according to an updating beam reported by the reporting module 71.

The base station, after receiving the updating beam reported by the UE, may send the beam update confirmation message to the UE, namely notifying the UE that the base station has performed beam adjustment.

According to the embodiment, in response to the number of times that the index of the SSB obtained by downlink synchronization is not in the predetermined beam window reaches the preset number of times, the beam updating message may be reported to the base station to enable the base station to adjust a beam, so that a certain number of beams can always be kept between the UE and the base station, thereby providing a basis for subsequent receiving of the paging message through part of the beams.

In an embodiment, the first receiving module 72 may further be configured to, in response to the beam update confirmation message sent by the base station is received, receive paging control information and a paging message from the base station.

In the embodiment, in response to a paging request of the UE appears in a present period, the base station, when sending the beam update confirmation message to the UE, may send the paging control information and the paging message to the UE.

According to the embodiment, in response to the beam update confirmation message sent by the base station is received, the paging control information and the paging message may be received from the base station, so that not only is the paging message received, but also transmission resources are saved.

Figure 8A:
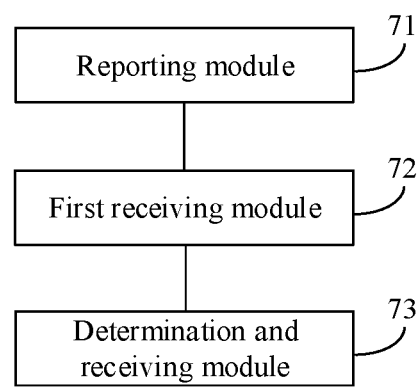
FIG. 8A is a block diagram of another beam reporting apparatus according to an exemplary embodiment.

FIG. 8A is a block diagram of another beam reporting apparatus according to an exemplary embodiment. As shown in FIG. 8A, based on the embodiment shown in FIG. 7, the apparatus may further include a determination and receiving module 73.

The determination and receiving module 73 is configured to, after the first receiving module 72 receives the beam update confirmation message from the base station, determine a beam updating window according to an updating beam in the beam updating message and a pre-received window size, and receive the paging control information and the paging message from the base station in the beam updating window.

In the embodiment, in response to the paging request of the UE appears in a next period, the base station may determine the beam updating window according to the updating beam and the pre-configured window size and send the paging control information and the paging message to the UE in the beam updating window. Correspondingly, the UE may also determine the beam updating window according to the updating beam and the pre-received window size and receive the paging control information and the paging message from the base station in the beam updating window.

According to the embodiment, the beam updating window may be determined according to the updating beam and the pre-received window size, and the paging control information and the paging message may be received from the base station in the beam updating window. In such a manner, the paging message may be received through the beam updating window, namely the paging message may be received through a certain number of beams rather than all beams, so that system resources can be effectively saved.

Figure 8B:
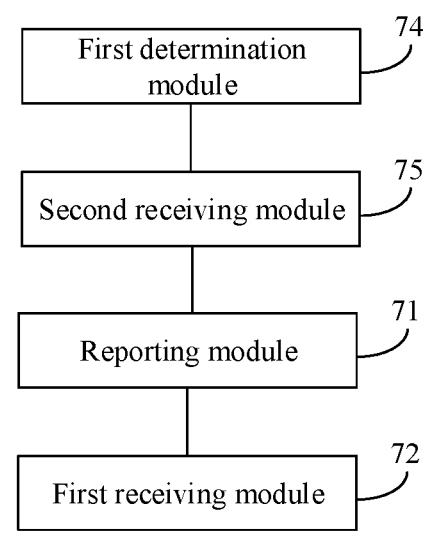
FIG. 8B is a block diagram of another beam reporting apparatus according to an exemplary embodiment.

FIG. 8B is a block diagram of another beam reporting apparatus according to an exemplary embodiment. As shown in FIG. 8B, based on the embodiment shown in FIG. 7, the apparatus may further include a first determination module 74 and a second receiving module 75.

The first determination module 74 is configured to, before the reporting module 71 reports the beam updating message to the base station, determine the beam window according to the received window size sent by the base station and beam information for downlink synchronization.

For example, when the window size is 2 and a beam index for downlink synchronization is 2, it may be determined that the beam window is beam {0, 1, 2, 3, 4}.

The second receiving module 75 is configured to receive the paging control information and the paging message from the base station in the beam window determined by the first determination module 74.

According to the embodiment, the beam window may be determined according to the received window size sent by the base station and beam information reported to the base station before DRX is entered, and the paging control information and the paging message may be received from the base station in the determined beam window, namely the paging message may be received through a certain number of beams rather than all beams, so that system resources can be effectively saved.

Figure 8C:
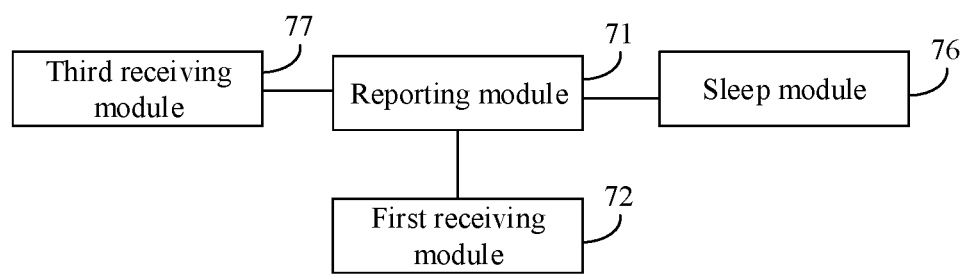
FIG. 8C is a block diagram of another beam reporting apparatus according to an exemplary embodiment.

FIG. 8C is a block diagram of another beam reporting apparatus according to an exemplary embodiment. As shown in FIG. 8C, based on the embodiment shown in FIG. 7, the apparatus may further include a sleep module 76 and a third receiving module 77.

The sleep module 76 is configured to, in response to the index of the SSB obtained by downlink synchronization is in the beam window but the paging control information is not received, enter a sleep mode.

The third receiving module 77 is configured to, in response to the index of the SSB obtained by downlink synchronization is in the beam window and the paging control information is received, receive the paging message according to the paging control information.

According to the embodiment, in response to the index of the SSB obtained by downlink synchronization is in the beam window but the paging control information is not received, the sleep mode may be entered, so that power consumption is reduced. In response to the index of the SSB obtained by downlink synchronization is in the beam window and the paging control information is received, the paging message may be received according to the paging control information, namely the paging message may be received through the beam window, namely through a certain number of beams rather than all the beams, so that the system resources can be effectively saved.

Figure 9:
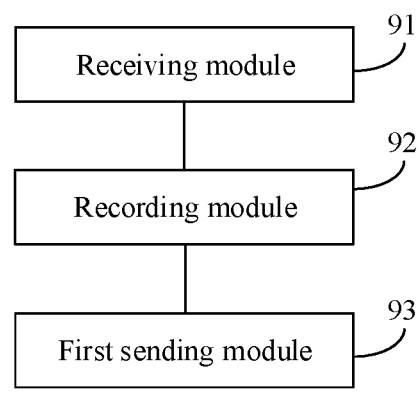
FIG. 9 is a block diagram of a beam adjustment apparatus according to an exemplary embodiment.

FIG. 9 is a block diagram of a beam adjustment apparatus according to an exemplary embodiment. The beam adjustment apparatus may be positioned in a base station. As shown in FIG. 9, the apparatus includes a receiving module 91, a recording module 92 and a first sending module 93.

The receiving module 91 is configured to receive a beam updating message reported by UE.

In the embodiment, during downlink synchronization, in response to a number of times that an index of an obtained SSB is not in a predetermined beam window reaches a preset number of times, the UE may report the beam updating message to a base station.

The recording module 92 is configured to record the beam updating message received by the receiving module 91.

The first sending module 93 is configured to, after the recording module 92 records the beam updating message, send a beam update confirmation message to the UE.

The base station, after adjusting a beam, may send the beam update confirmation message to the UE.

According to the embodiment, the beam updating message reported by the UE may be received and recorded, and then the beam update confirmation message may be sent to the UE to implement beam adjustment, so that a certain number of beams can always be kept between the UE and the base station, thereby providing a basis for subsequent receiving of the paging message through part of the beams.

In an embodiment, the first sending module 93 may further be configured to, in response to a paging request of the UE appears in a present period, send paging control information and a paging message to the UE when the beam update confirmation message is sent to the UE.

According to the embodiment, when the beam update confirmation message is sent to the UE, the paging control information and the paging message may be sent to the UE, so that not only is the paging message sent, but also transmission resources are saved.

Figure 10:
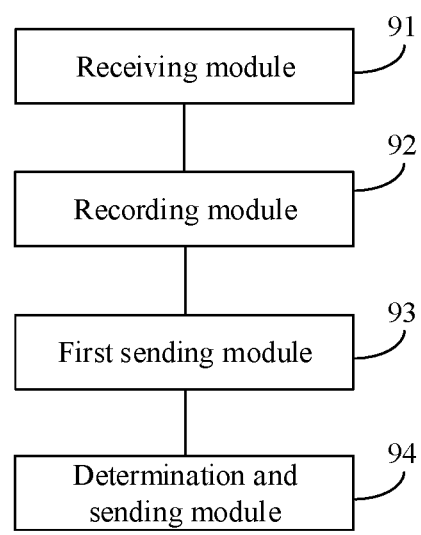
FIG. 10 is a block diagram of another beam adjustment apparatus according to an exemplary embodiment.

FIG. 10 is a block diagram of another beam adjustment apparatus according to an exemplary embodiment. As shown in FIG. 10, based on the embodiment shown in FIG. 9, the apparatus may further include a determination and sending module 94.

The determination and sending module 94 is configured to, after the first sending module 93 sends the beam update confirmation message to the UE and when the paging request of the UE appears in a next period, send the paging control information and the paging message to the UE in a beam updating window determined according to an updating beam in the beam updating message and a pre-configured window size.

In the embodiment, in response to the paging request of the UE appears in the next period, the base station may send the paging control information and the paging message to the UE in the beam updating window. Correspondingly, the UE may receive the paging control information and the paging message from the base station in the beam updating window.

According to the embodiment, the paging control information and the paging message may be sent to the UE in the beam updating window. In such a manner, the paging message may be sent through the beam updating window, namely the paging message may be sent through a certain number of beams rather than all beams, so that system resources can be effectively saved.

Figure 11:
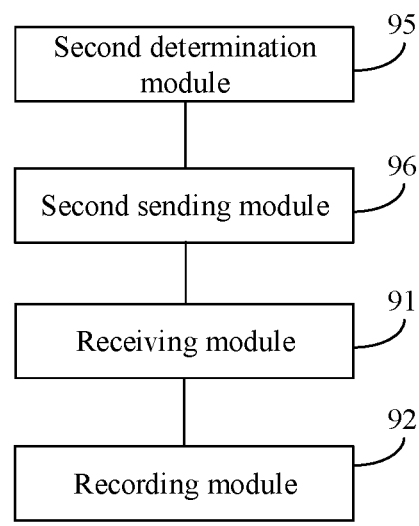
FIG. 11 is a block diagram of another beam adjustment apparatus according to an exemplary embodiment.

FIG. 11 is a block diagram of another beam adjustment apparatus according to an exemplary embodiment. As shown in FIG. 11, based on the embodiment shown in FIG. 9, the apparatus may further include a second determination module 95 and a second sending module 96.

The second determination module 95 is configured to, before the receiving module 91 receives the updating beam reported by the UE, determine a beam window according to a window size and received beam information. The window size is configured for and sent to the UE. The received beam information is configured for downlink synchronization and reported by the UE before entering DRX.

The window size may be sent through, but not limited to, an RRC message. An implementation manner is simple.

The second sending module 96 is configured to send the paging control information and the paging message to the UE in the beam window determined by the second determination module 95.

According to the embodiment, the beam window may be determined according to the window size and the received beam information, the window size being configured for and sent to the UE, and the received beam information being configured for downlink synchronization and reported by the UE before entering DRX; and the paging control information and the paging message may be sent to the UE in the determined beam window, namely the paging message may be sent through a certain number of beams rather than all the beams, so that the system resources can be effectively saved.

Figure 12:
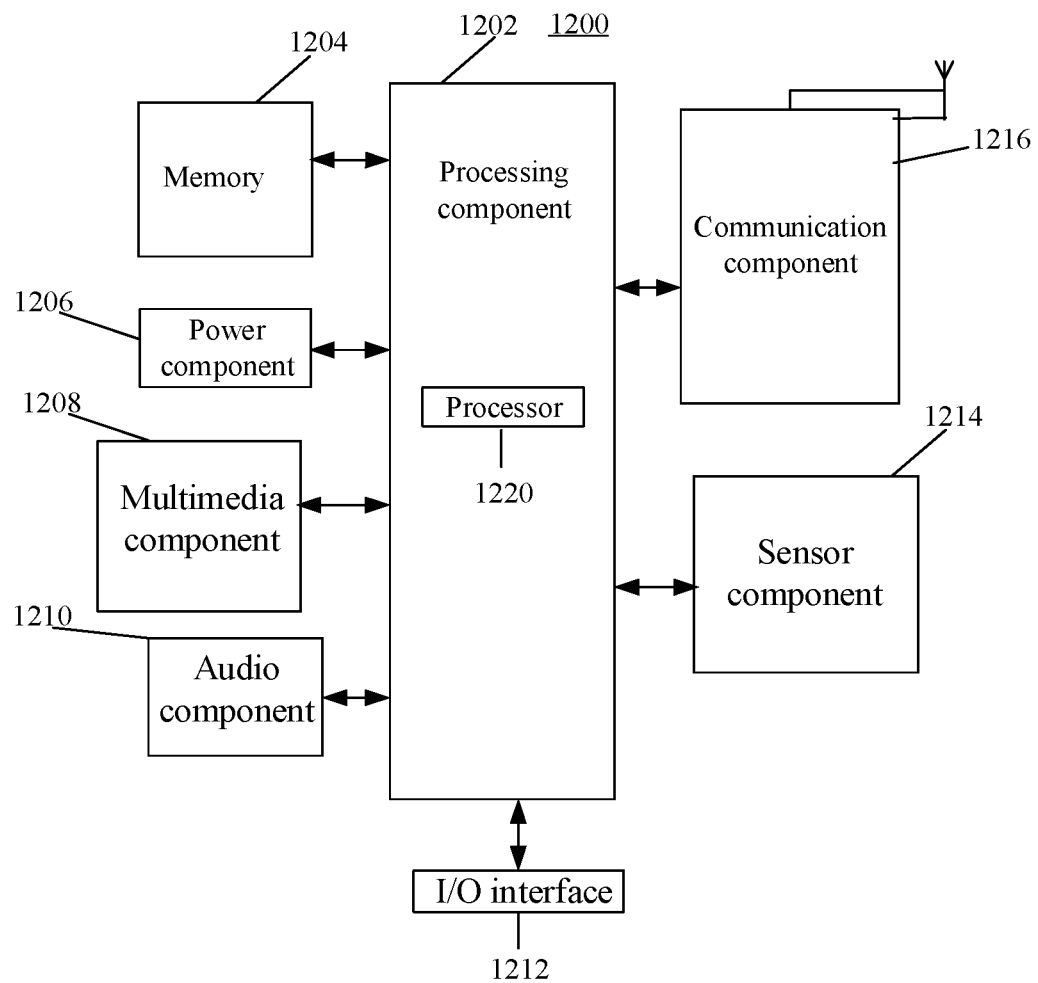
FIG. 12 is a block diagram of an apparatus applied to beam reporting according to an exemplary embodiment.

FIG. 12 is a block diagram of an apparatus applied to beam reporting according to an exemplary embodiment. For example, the apparatus 1200 may be UE such as a mobile phone, a computer, a digital broadcast terminal, a messaging device, a gaming console, a tablet, a medical device, exercise equipment and a personal digital assistant.

Referring to FIG. 12, the apparatus 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 typically is configured to control overall operations of the apparatus 1200, such as the operations associated with display, telephone calls, data communications, camera operations, and recording operations. The processing component 1202 may include one or more processors 1220 to execute instructions to perform all or part of the steps in the abovementioned method. Moreover, the processing component 1202 may include one or more modules which facilitate interaction between the processing component 1202 and the other components. For instance, the processing component 1202 may include a multimedia module to facilitate interaction between the multimedia component 1208 and the processing component 1202.

One processor 1220 in the processing component 1202 may also be configured to:
in response to a number of times that an index of an SSB obtained by downlink synchronization is not in a predetermined beam window reaches a preset number of times, report a beam updating message to a base station; and
receive a beam update confirmation message sent by the base station.

The memory 1204 is configured to store various types of data to support the operation of the apparatus 1200. Examples of such data may include instructions for any application programs or methods operated on the apparatus 1200, contact data, phonebook data, messages, pictures, video, etc. The memory 1204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 may provide power for various components of the apparatus 1200. The power component 1206 may include a power management system, one or more power supplies, and other components associated with generation, management and distribution of power for the apparatus 1200.

The multimedia component 1208 may include a screen for providing an output interface between the apparatus 1200 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1208 includes a front camera and/or a rear camera. The front camera and/or the rear camera may receive external multimedia data when the apparatus 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 may include a Microphone (MIC), and the MIC is configured to receive an external audio signal when the apparatus 1200 is in the operation mode, such as a call mode, a recording mode and a voice recognition mode. The received audio signal may further be stored in the memory 1204 or sent through the communication component 1216. In some embodiments, the audio component 1210 further includes a speaker configured to output the audio signal.

The I/O interface 1212 may provide an interface between the processing component 1202 and a peripheral interface module, and the peripheral interface module may be a keyboard, a click wheel, a button and the like. The button may include, but not limited to: a home button, a volume button, a starting button and a locking button.

The sensor component 1214 may include one or more sensors configured to provide status assessment in various aspects for the apparatus 1200. For instance, the sensor component 1214 may detect an on/off status of the apparatus 1200 and relative positioning of components, such as a display and small keyboard of the apparatus 1200, and the sensor component 1214 may further detect a change in a position of the apparatus 1200 or a component of the apparatus 1200, presence or absence of contact between the user and the apparatus 1200, orientation or acceleration/deceleration of the apparatus 1200 and a change in temperature of the apparatus 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the apparatus 1200 and another device. The apparatus 1200 may access a communication-standard-based wireless network, such as a Wireless Fidelity (WiFi) network, a 2nd-Generation (2G) or 3rd-Generation (3G) network or a combination thereof. In an exemplary embodiment, the communication component 1216 receives a broadcast signal or broadcast associated information from an external broadcast management system through a broadcast channel. In an exemplary embodiment, the communication component 1216 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the apparatus 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1204 including an instruction, and the instruction may be executed by the processor 1220 of the apparatus 1200 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Figure 13:
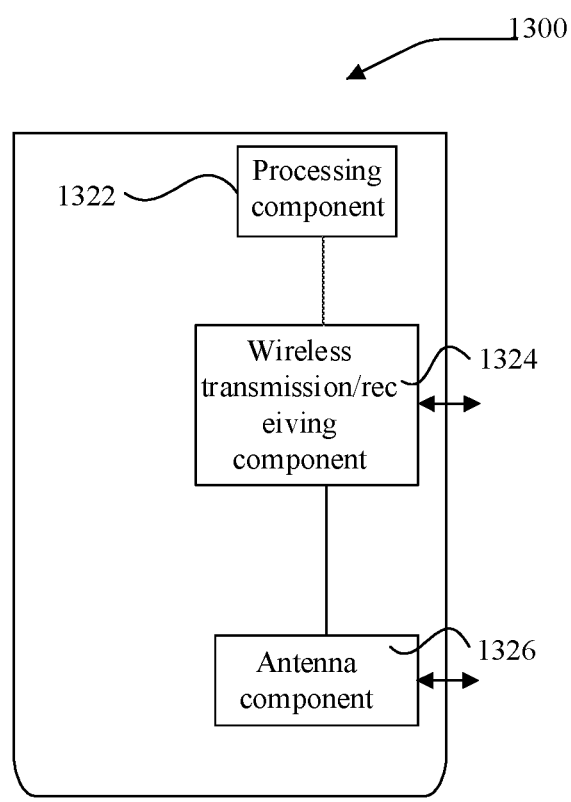
FIG. 13 is a block diagram of an apparatus applied to beam adjustment according to an exemplary embodiment.

FIG. 13 is a block diagram of another apparatus applied to beam reporting according to an exemplary embodiment. The apparatus 1300 may be provided as a base station. Referring to FIG. 13, the apparatus 1300 includes a processing component 1322, a wireless transmission/receiving component 1324, an antenna component 1326 and a wireless interface-specific signal processing part, and the processing component 1322 may further include one or more processors.

One processor in the processing component 1322 may be configured to: receive a beam updating message reported by UE; record the beam updating message; and send a beam update confirmation message to the UE.

In an exemplary embodiment, there is also provided a non-transitory computer-readable storage medium including an instruction, and the instruction may be executed by the processing component 1322 of the apparatus 1300 to implement the beam adjustment method. For example, the non-transitory computer-readable storage medium may be a ROM, a RAM, a CD-ROM, a magnetic tape, a floppy disc, an optical data storage apparatus and the like.

The apparatus embodiments substantially correspond to the method embodiments, and thus related parts refer to part of descriptions of the method embodiments. The apparatus embodiment described above is only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the embodiments. Those of ordinary skill in the art may understand and implement without creative work.

It is to be noted that relational terms "first", "second" and the like in the present disclosure are adopted only to distinguish one entity or operation from another entity or operation and not always to require or imply existence of any such practical relationship or sequence between the entities or operations. Terms "include" and "have" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . " does not exclude existence of another element that is the same in a process, method, object or device including the element.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for beam reporting, applied to User Equipment (UE), comprising:
    in response to determining that a number of times that an index of a Synchronous Signal Block (SSB) obtained by downlink synchronization is not within a predetermined beam window reaches a preset number of times, reporting a beam updating message to a base station; and receiving a beam update confirmation message from the base station:
    in response to receiving the beam update confirmation message from the base station, receiving paging control information and a paging message from the base station; or after receiving the beam update confirmation message from the base station, determining a beam updating window according to an updating beam in the beam updating message and a pre-received window size, and receiving the paging control information and the paging message from the base station in the beam updating window.

2. The method of claim 1, further comprising:
    before reporting the beam updating message to the base station, determining a beam window according to a received window size sent by the base station and beam information for downlink synchronization; and receiving paging control information and paging message from the base station in the beam window.

3. The method of claim 1, further comprising:

in response to determining that the index of the SSB obtained by downlink synchronization is within the predetermined beam window but paging control information is not received, entering a sleep mode; and in response to determining that the index of the SSB obtained by downlink synchronization is within the beam window and the paging control information is received, receiving paging message according to the paging control information.

4. A method for beam adjustment, applied to a base station, comprising:

receiving a beam updating message reported by User Equipment (UE), wherein the UE reports the beam updating message in response to determining that a number of times that an index of a Synchronous Signal Block (SSB) obtained by downlink synchronization is not within a predetermined beam window reaches a preset number of times;

recording the beam updating message; and sending a beam update confirmation message to the UE:

in response to determining that a paging request by the UE is made in a present period, sending paging control information and a paging message to the UE when sending the beam update confirmation message to the UE;

or in response to determining that a paging request by the UE is made in a next period, sending the paging control information and the paging message to the UE in a beam updating window determined according to an updating beam in the beam updating message and a pre-configured window size.

5. The method of claim 4, further comprising:

before receiving the beam updating message reported by the UE, determining a beam window according to a window size and received beam information, wherein the window size is configured for and sent to the UE, and the received beam information is reported by the UE before entering Discontinuous Reception (DRX) and is configured for downlink synchronization; and sending the paging control information and the paging message to the UE in the beam window.

6. The method of claim 5, wherein the window size is sent through a Radio Resource Control (RRC) message.

7. A User Equipment (UE), comprising:

a processor; and a memory configured to store an instruction executable by the processor, wherein the processor is configured to:

in response to determining that a number of times that an index of a Synchronous Signal Block (SSB) obtained by downlink synchronization is not within a predetermined beam window reaches a preset number of times, report a beam updating message to a base station; and receive a beam update confirmation message from the base station according to the beam updating message:

in response to determining that the beam update confirmation message sent by the base station is received, receive paging control information and a paging message from the base station;

or after receiving the beam update confirmation message from the base station, determine a beam updating window according to an updating beam in the beam updating message and a pre-received window size, and receive the paging control information and the paging message from the base station in the beam updating window.

8. The UE of claim 7, wherein the processor is further configured to:

before report module reports the beam updating message to the base station, determine a beam window according to a received window size sent by the base station and beam information for downlink synchronization; and receive paging control information and paging message from the base station in the beam window.

9. The UE of claim 7, wherein the processor is further configured to:

in response to determining that the index of the SSB obtained by downlink synchronization is within the predetermined beam window but paging control information is not received, enter a sleep mode; and in response to determining that the index of the SSB obtained by downlink synchronization is within the beam window and the paging control information is received, receive paging message according to the paging control information.

* * * * *